Jan. 7, 1969  R. G. CARLSON  3,419,952
METHOD FOR MAKING COMPOSITE MATERIAL
Filed Sept. 12, 1966
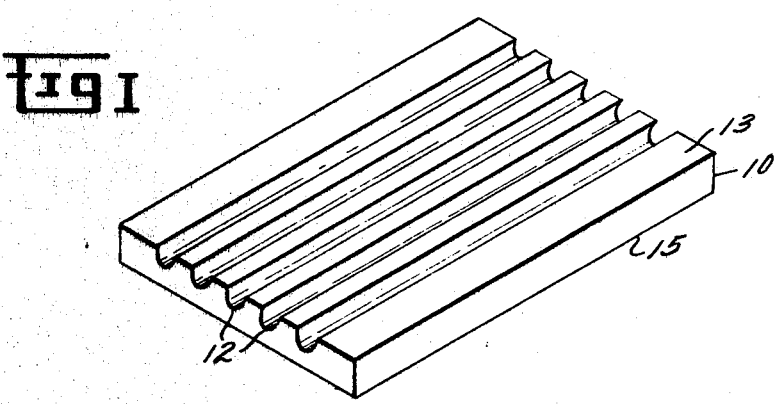
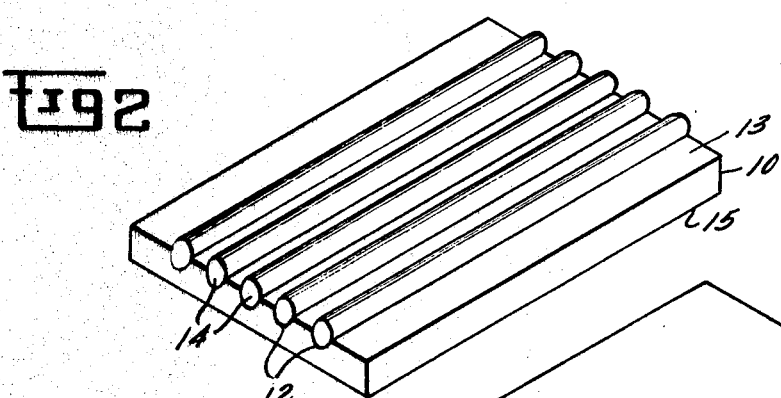
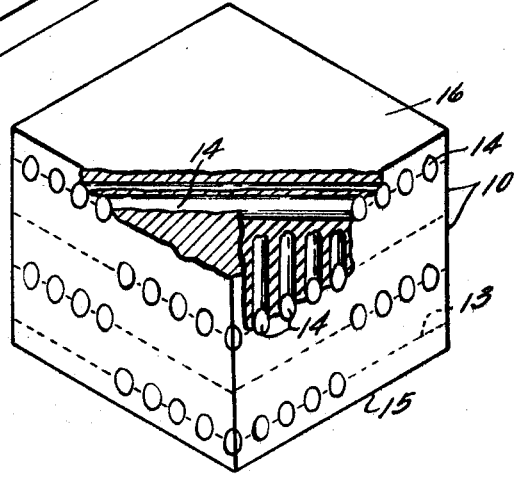
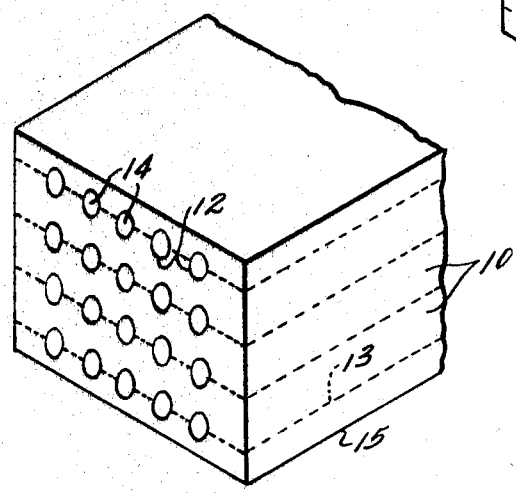
INVENTOR.
ROBERT G. CARLSON
BY
Lee Decles
ATTORNEY

United States Patent Office 3,419,952
Patented Jan. 7, 1969

3,419,952
METHOD FOR MAKING COMPOSITE MATERIAL
Robert G. Carlson, Greenhills, Ohio, assignor to General Electric Company, a corporation of New York
Continuation-in-part of application Ser. No. 484,331, Sept. 1, 1965. This application Sept. 12, 1966, Ser. No. 578,602
U.S. Cl. 29—471.3         7 Claims
Int. Cl. B23k 31/00

This invention relates to composite materials and, more particularly, to metallic composites reinforced with oriented metallic fibers. This application is a continuation-in-part of application Ser. No. 484,331 for "Composite Material and Method for Making," filed Sept. 1, 1965 and assigned to the same assignee as the present invention.

Advanced aircraft gas turbine engines are becoming more and more dependent on the development of newer and stronger materials, some of a complex nature, in order to attain high thrust-to-weight ratios. Included in the materials of interest are the composite metallic structures which are strengthened by oriented reinforcing members, such as wires, fibers and filaments, of relatively small diameter but of relatively high length-to-diameter ratio ($L/d$).

Described in the above identified application of which this is a continuation-in-part is an improved composite metallic material and method for making. One of the problems discussed in that application and of interest to those working in this art, is that of avoiding contact between reinforcing members in order to more efficiently transfer any applied load from the matrix carrying the members to the reinforcing members themselves.

It is a principal object of the present invention to provide an improved method for making a composite metallic material strengthened by metallic high strength reinforcing members in a manner which avoids contact between such high strength members.

Another object is to provide a method for making a composite material having either uniaxial or multiaxial orientation of high strength reinforcing members while avoiding contact between such members.

These and other objects and advantages will be more clearly understood from the following detailed description, examples and from the drawing in which:

FIG. 1 is an isometric representation of a sheet of a metal in which aligned grooves have been prepared;

FIG. 2 is the sheet of FIG. 1 in which high strength reinforcing members such as filaments have been located or pressed in the grooves; and FIGS. 3 and 4 are isometric representations of finished and bonded composite structures made according to the method of the present invention including uniaxially oriented as well as biaxially oriented reinforcing and strengthening members.

The above objects can be fulfilled by a method which includes first providing in each of a plurality of sheets of a metal a plurality of aligned and substantially parallel grooves. Placed in each of the grooves is a reinforcing member in the form of a fiber, filament or wire having a diameter of between about 0.001–0.01" after which the plurality of sheets including the reinforcing members are stacked one upon the other so that the top of each reinforcing member is positioned opposite the bottom of a superimposed sheet. Then the stacked layers are vacuum hot pressed into an integrally bonded composite structure. The vacuum hot pressing can be preceded by a preliminary warm pressing of each sheet individually, if desired, to more carefully align and secure the reinforcing members in its matrix sheet.

The efficiency of transfer of tensile stress from a matrix to a wire, fiber or filament within a matrix depends upon the bond between the wire, fiber or filament and the matrix. One of the basic assumptions for such reinforced composites is that the major portion of the load is carried by the reinforcing member. In order for this to occur, such members must be strong, must be held tightly by the matrix and must be properly oriented with regard to the direction of the applied load. With all reinforcing members oriented substantially parallel to the loading direction, the load is transferred by shear forces to the fiber-matrix interface. The shear stresses are concentrated and maximized at the ends of the members and minimized at the center of the member length. Conversely, tensile stresses are inversely proportional to the shear stresses. The magnitude of these shear and tensile stresses depends on the aspect ratio (length-to-diameter or $L/d$), on the orientation, on the volume fraction of the reinforcing member, on the bond relationship, on the strength of both the matrix and the reinforcing member and finally on the applied load. It has been found that a particularly unusual and high strength-to-weight ratio composite can be produced by prelocating in grooves and securing oriented continuous wires, fibers or filaments of particularly sized reinforcing members such as a boron coated tungsten filament which has become known in the art as a "boron filament." This member is made by coating boron in a continuous vapor deposition process. Boron can be deposited from a mixture of boron trichloride and hydrogen in a process of the type described in "Boron-synthesis, Structure and Properties," edited by Kohn, Nye and Gaulé published by Plenum Press, Inc., New York, 1960. Another reinforcing member used successfully is beryllium wire, coated or uncoated. These reinforcing members are oriented symmetrically in a substantially non-porous matrix sheet or foil of a metal of the group aluminum, titanium and their alloys. For particular strength along an article's tensile axis, the members are continuous and oriented substantially parallel along the tensile axis throughout the length of the material of the article such as an axial flow compression blading member made from the material. Similarly, if a material is desired having strength characteristics along various axes, random orientation of the fibers are desired. One of the problems to be overcome in preparing a random arrangement is to avoid contact between adjacent reinforcing members to increase the efficiency of transfer of the load from the matrix to the wire, fiber or filament itself and to avoid breakage of such member. One form of the present invention provides a method for solving such problem by superimposing a plurality of sheets, one upon the other. Each sheet includes a substantially parallel arrangement of reinforcing members but the sheets are stacked to provide any desired uniform or random arrangement in the total composite member.

The filaments used in the evaluation of the method of the present invention had an overall diameter of between about 0.001–0.005" and a length to diameter ratio ($L/d$) of greater than 20 as described in the above identified application of which this is a continuation-in-part.

Although details and specific examples will be discussed later, this invention will be more readily understood by reference to the drawings. The method of the present invention involves preparing, such as by sizing and shaping and cleaning, a sheet of a metallic material, such as selected from aluminum, titanium and its alloys, indicated at 10 in FIG. 1. Aligned and substantially parallel grooves 12 were then produced in the top face 13 of the sheets by a photochemical etching process of the type widely used in the microelectronics art to produce fine etched channels in metal. Because the grooves are substantially parallel, adjacent grooves do not join one another. In the process used in the particular evaluation of the present invention, a positive master was produced and subsequently reduced by a factor of 20-to-1. From this negative, a positive was obtained and used in stabilizing exposed photo sensitive "resist" coatings on the surface of the matrix sheet 10. The "resist" coated surface was then subjected to a suitable etching media which attacks the unexposed, grooved sections.

After preparation of the grooves, a plurality of the above described reinforcing members such as filaments 14 in FIG. 2 having a diameter of 0.001–0.005" and $L/d$ of greater than 20 were placed or pressed in the grooves. Then a plurality of the sheets thus prepared were stacked one on the other in the aligned or uniaxial relationship shown in FIG. 3 or in a random or biaxially arrangement shown in FIG. 4. The sheets are stacked such that top face 13 including filaments 14 is positioned opposite bottom face 15 of the next above sheet. This complex arrangement thus prepared can then be vacuum hot pressed such as at 1000° F. for thirty minutes under a pressure of 2000–4000 pounds per square inch to result in a bonded composite and strengthened material. If desired, a cover sheet 16 in FIG. 4 can be placed over the top of each composite structure to fully imbed all of the reinforcing or strengthening members.

As was mentioned above, and has been described in the application of which this is a continuation-in-part, it was recognized that the low aspect ratios ($L/d$) in the order of 20 or below or discontinuous fibers resulted in significantly lower composite yield strength than those with a ratio greater than 20. Thus the method of the present invention includes the use of reinforcing members having a length-to-diameter ratio greater than 20.

A series of evaluations were conducted using continuous boron filaments having an overall diameter of 0.003–0.004" on a tungsten substrate having a diameter of 0.0006 inch. A plurality of commercially pure aluminum sheets were prepared each with a plurality of aligned, substantially parallel grooves each having a cross sectional diameter of about 0.005 inch. The plurality of sheets including the boron filaments were stacked one upon the other as shown generally in FIG. 3. Then the sheets were heated at a temperature of 1000° F., within the broad range of 850–1500° F., for 30 minutes under a pressure of 3500–4000 p.s.i. at a vacuum of about $10^{-5}$ torr to produce an 8–40 volume percent of filaments as shown in Table I. The following Table I also shows theoretical strength reinforcement of 80–100%.

TABLE I.—ROOM TEMPERATURE PROPERTIES

| Example | Vol. percent | Powder added | UTS (ksi) | Modulus elasticity | Percent theoretical UTS |
| --- | --- | --- | --- | --- | --- |
| 1 | 0 | Al | 12.1 | 9.0 | |
| 2 | 8 | Al | 38.0 | 12.8 | 105 |
| 3 | 9 | Al | 41.5 | 13.5 | 99 |
| 4 | 10 | Al | 43.8 | 15.8 | 101 |
| 5 | 12 | Al | 42.2 | 19.1 | 82 |
| 6 | 40 | Al | 93.0 | | 64 |
| 7 | 12 | None | 52.1 | 19.1 | 101 |
| 8 | 17 | None | 65.5 | | 99 |
| 9 | 25 | None | 82.4 | 22.4 | 87 |
| 10 | 26 | None | 81.5 | | 84 |

The process used in the preparation of the composites, the data for which are shown in the above Table I, involved first photochemical etching aligned and substantially parallel grooves in the aluminum sheet matrix and then placing the filaments in the grooves. A plurality of sheets so prepared were aligned symmetrically one upon the other, as shown in FIG. 3, so that the filaments were not in contact with one another. The number of filaments were varied to provide the volume percent desired for testing. After stacking, the modules were diffusion bonded as shown in Table I to complete the densification and to establish strong interfacial bonds between the filaments and the matrix. In this particular series of tests, in order to promote integral bonding between the reinforcing members and the bottom of the superimposed sheet, the top surface including the wires, in some modules, were covered with a small amount of $-325$ mesh aluminum powder as indicated in Table I.

In an avaluation of boron filaments in various environments such as in a vacuum (inside a tantalum can); in contact with unalloyed titanium powder (inside a titanium can) and in contact with unalloyed titanium hydride powder (inside a titanium can) at temperatures between 1300 and 1700° F., certain limitations were discovered. It was noted that exposure of the filaments to titanium or vacuum environments at temperatures above about 1500° F. significantly lowers filament strength. Therefore the present invention, particularly as it relates to the use of boron filaments, involves the fabrication a temperatures less than 1500° F. in order to maintain filament integrity and strength.

Because of the success of the boron filament-aluminum sheet composites of which the above example is typical, other evaluations were performed with both a titanium matrix, and a titanium alloy matrix using both boron filaments as well as beryllium filaments. In one evaluation of the method of the present invention, a series of composites were prepared as generally described above with increasing volume percentages of 0.005" diameter beryllium wire from between about 5 volume percent to about 25 volume percent. In addition, coatings of aluminum or titanium were placed on the beryllium wire to test the effect of such coatings on the strength and integrity of the composite. As is shown by the data of the following table, the bonding efficiency as measured by the percent of theoretical yield strength was not affected by the beryllium wire coatings evaluated. In addition, the evaluations indicated that the best compacting conditions consisted of warm pressing aluminum-coated beryllium wire at 64,000 p.s.i. at a temperature of 300° F. for ten minutes.

TABLE II.—Al SHEET MATRIX—Be WIRE COMPOSITE

| Ex. | Vol. percent | Wire coating | Warm pressing (10 minutes) | | 500° F. yield str. (k.s.i.) | Percent theor. yield strength |
| --- | --- | --- | --- | --- | --- | --- |
| | | | Pressure (k.s.i.) | Temp. (° F.) | | |
| 11 | 7.7 | Al | 80 | 300 | 11.1 | 100 |
| 12 | 17.5 | Al | 80 | 300 | 18.3 | 99 |
| 13 | 19.7 | Al | 80 | 250 | 19.8 | 99 |
| 14 | 25.8 | Al | 80 | 300 | 22.7 | 95 |
| 15 | 13.3 | None | 64 | 250 | 14.6 | 96 |
| 16 | 14.1 | Al | 64 | 250 | 15.1 | 95 |
| 17 | 19.0 | Al | 64 | 300 | 20.3 | 103 |
| 18 | 18.8 | Al | 64 | 350 | 18.5 | 96 |
| 19 | 15.7 | Ti | 64 | 250 | 16.2 | 95 |

The composites prepared in the evaluation of the examples of the above Table II showed good ductility of about 9% elongation in tension. Preliminary ballistic impact tests indicated no fracture of beryllium wire in the impacted area and little or no deterioration of the Al/Be bond.

The aluminum sheet used in the evaluation of the examples in the Table II was commercially pure aluminum with the ASTM specification 1100-0. The beryllium wire had a diameter of 0.005 inch. At 500° F. the aluminum sheet had a yield strength of 2000 p.s.i. and the beryllium wire had an ultimate strength of 80,000 p.s.i.

The beryllium wires were cut into ten inch lengths and, when coated with aluminum, were coated in an ultra high vacuum system, for example at about $10^{-7}$, at which the wires were vapor coated. The metal evaporant was resistance heated from a surrounding helix until the wires were uniformly coated.

The tensile tests data shown in Table II were made at a nominal loading rate of 0.005 inch per minute and the ballistic impact tests referred to above were performed at room temperature using a 0.174 inch diameter steel ball at velocities of 180 feet per second. The improvement in strength and the approach of the strength to 100 percent theoretical yield strength in the data of the above Table II shows the ability of the beryllium wire to reinforce the aluminum matrix when composited according to the present invention.

In another series of tests, a composite using as a matrix a titanium alloy consisting nominally, by weight, 6% Al, 4% V with the balance Ti was fabricated according to the method of the present invention generally described above. The etchant used in the photochemical etching step and which works satisfactorily on such a titanium alloy consists essentially of, by volume, 45% HF, 15% $HNO_3$ and 40% $H_2O$ to which was added several drops of a wetting agent. The modules were aligned as described above and vacuum hot pressed at 1300–1500° F. for about 10 minutes at a pressure of 4000–7000 p.s.i.

Composites of the above described titanium alloy and boron filaments modules were made at varying volume percentages of about 10–20 volume percent of boron filaments. In order to promote bonding between the plurality of module sheets of titanium alloy and the boron filaments, a small amount of titanium hydride powder applied as an ethyl alcohol slurry was placed over the top surface of each sheet and aligned filaments prior to stacking.

In one example, the composite was hot pressed at 1300° F. for ten minutes at 4500 pounds per square inch. At about an eight volume perecent boron filament concentration, a room temperature yield strength of 60,300 pounds per square inch was obtained with an ultimate strength of about 93,000 pounds per square inch.

The method of the present invention thus includes first the performing or compositing of individual modules composed of metallic reinforcing members embedded in a matrix sheet or foil. Because the reinforcing members are embedded and alingned substantially parallel in the matrix prior to hot pressing, member to member contact is virtualy eliminated. As shown from the tables and other examples, composites made according to this invention and including wires, filaments and fibers having an $L/d$ of greater than 20 show significant increases in strength over the strength of the matrix material alone. For example, a composite of aluminum matrix including beryllium wires shows almost an order of magnitude increases in strength.

Although the present invention has been described in connection with specific examples, it will be understood by those skilled in the art the variations and modifications of which the invention is capable. It is intended by the appended claims to cover all such variations and modifications.

What is claimed is:
1. A method for making a composite metallic material comprising the steps of:
    (a) sizing and shaping a plurality of sheets of metal selected from the group consisting of aluminum, titanium and their alloys, each sheet having a top face and a bottom face;
    (b) producing in the top face of each of the plurality of sheets a plurality of aligned substantially parallel grooves such that adjacent grooves do not join one another;
    (c) placing in each of the grooves a reinforcing member, a wire, fiber or filament selected from the group consisting of boron and beryllium, having a diameter of about 0.001–0.01″ and a length-to-diameter ratio greater than 20;
    (d) stacking the plurality of sheets one upon the other so that the reinforcing members in the top face of each sheet are positioned opposite the bottom face of the next above of the plurality of sheets; and then
    (e) pressing the plurality of sheets one toward the others with a pressure of about 1000–10,000 p.s.i. while at the same time heating the sheets at a temperature of 800–1500° F. in a vacuum to integrally bond the sheets one to the other and to integrally bond the reinforcing members to the sheets.
2. The method of claim 1 in which:
    (a) the grooves are produced by photochemical etching; and
    (b) a powder selected from the group consisting of Al, Ti and their hydrides is placed over the top surface and reinforcing members after the members have been placed in the grooves in each sheet and prior to stacking, the Al and its hydrides being selected when the sheet is based on Al, and Ti and its hydrides being selected when the sheet is based on titanium.
3. The method of claim 1 in which each sheet including the reinforcing member, prior to stacking one upon the other, is heated at a temperature of about 250–500° F. and under a pressure of 1000–80,000 p.s.i. to warm press and preliminarily bond the sheet and reinforcing members together.
4. The method of claim 1 in which the reinforcing members:
    (a) have a diameter of 0.001–0.005″; and
    (b) are placed in grooves and the sheets are stacked in amounts to produce in the composite a 5–40% by volume of reinforcing members.
5. The method of claim 4 in which the volume percentage of reinforcing members is 5–15%.
6. The method of claim 4 in which the sheets are passed at a pressure of about 3500–4000 p.s.i. at a temperature of about 1000° F. for about 30 minutes.
7. The method of claim 1 in which the reinforcing members are coated with a metal selected from the group consisting of Al and Ti, the Al selected when the sheet is selected from Al and its alloys and the Ti selected when the sheet is Ti and its alloys.

References Cited
UNITED STATES PATENTS

| | | | |
|---|---|---|---|
| 1,125,163 | 1/1915 | Page | 29—191.4 |
| 1,451,041 | 4/1923 | Hyde | 29—471.3 |
| 1,628,759 | 5/1927 | Worrall | 29—471.3 X |
| 2,169,937 | 8/1939 | Wempe. | |
| 2,807,082 | 9/1957 | Zambrow | 29—504 X |
| 3,084,421 | 4/1963 | McDanels | 29—420.5 X |
| 3,201,862 | 8/1965 | Gotoh | 29—497.5 X |
| 3,320,666 | 5/1967 | Dion | 29—482 X |
| 3,371,407 | 3/1968 | Forsyth | 29—498 X |
| 3,372,470 | 3/1968 | Bindari | 29—470.1 X |

JOHN F. CAMPBELL, *Primary Examiner.*

R. F. DROPKIN, *Assistant Examiner.*

U.S. Cl. X.R.

29—197.5, 198, 471.5, 471.7, 472.3, 478, 482, 494, 497, 497.5, 498, 504, 419, 191.4